United States Patent
He

(10) Patent No.: US 12,452,690 B2
(45) Date of Patent: Oct. 21, 2025

(54) TRAFFIC SCENARIO IDENTIFICATION METHOD AND APPARATUS, DEVICE, AND STORAGE MEDIUM

(71) Applicant: ZTE CORPORATION, Shenzhen (CN)

(72) Inventor: Shiming He, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 321 days.

(21) Appl. No.: 18/263,805

(22) PCT Filed: Nov. 26, 2021

(86) PCT No.: PCT/CN2021/133696
§ 371 (c)(1),
(2) Date: Aug. 1, 2023

(87) PCT Pub. No.: WO2022/166334
PCT Pub. Date: Aug. 11, 2022

(65) Prior Publication Data
US 2024/0137777 A1  Apr. 25, 2024
US 2024/0236697 A9  Jul. 11, 2024

(30) Foreign Application Priority Data
Feb. 8, 2021  (CN) .......................... 202110172620.3

(51) Int. Cl.
*H04W 16/22* (2009.01)
*G06F 18/20* (2023.01)
(Continued)

(52) U.S. Cl.
CPC ............ *H04W 16/22* (2013.01); *G06F 18/20* (2023.01); *G06F 18/241* (2023.01); *H04W 24/08* (2013.01)

(58) Field of Classification Search
CPC ..... H04W 16/22; H04W 24/08; H04W 24/02; H04W 24/04; G06F 18/20; G06F 18/241;
(Continued)

(56) References Cited

U.S. PATENT DOCUMENTS 9,336,456 B2 *  5/2016  DeLean ................. G06V 40/20
11,262,742 B2 *  3/2022  Srinivasamurthy ..... G06F 18/22
(Continued)

FOREIGN PATENT DOCUMENTS

| CN | 101808339 A | 8/2010 |
|----|-------------|--------|
| CN | 101998465 A | 3/2011 |

(Continued)

OTHER PUBLICATIONS

European Patent Office. Extended European Search Report for EP Application No. 21924329.2, mailed Jul. 26, 2024, pp. 1-13.
(Continued)

*Primary Examiner* — Mahendra R Patel
(74) *Attorney, Agent, or Firm* — Vivacqua Crane, PLLC

(57) ABSTRACT

A traffic scenario identification method and apparatus, a device, and a storage medium are disclosed. The method may include: constructing a plurality of data features according to user data of a cell to be identified within a set period of time (S110), the data features including cell-level features and sector-level features; selecting, from the plurality of data features, a set number of data features corresponding to a candidate traffic scenario (S120); and inputting the set number of data features into a scenario identification binary classification model corresponding to the candidate traffic scenario to obtain a target traffic scenario of the cell to be identified (S130).

13 Claims, 3 Drawing Sheets

(51) Int. Cl.
*G06F 18/241* (2023.01)
*H04W 24/08* (2009.01)

(58) Field of Classification Search
CPC .. G06F 18/211; G06F 18/217; G06F 18/2413; G06F 18/214; G06F 18/243; G06Q 50/50; G06Q 50/40
USPC ..................................................... 455/422.1
See application file for complete search history.

(56) References Cited

U.S. PATENT DOCUMENTS

| | | | |
|---|---|---|---|
| 11,385,633 B2* | 7/2022 | Hazard | G06V 10/454 |
| 11,599,667 B1* | 3/2023 | Tutuianu | G06N 5/04 |
| 2019/0156150 A1* | 5/2019 | Krishnan | G06V 40/70 |
| 2019/0166505 A1* | 5/2019 | Zhao | H04W 16/18 |
| 2019/0166606 A1* | 5/2019 | Kalderen | H04W 72/542 |
| 2019/0324444 A1* | 10/2019 | Cella | G06N 3/088 |
| 2020/0285464 A1* | 9/2020 | Brebner | G06F 8/36 |
| 2020/0350057 A1* | 11/2020 | el Kaliouby | G16H 40/67 |

FOREIGN PATENT DOCUMENTS

| | | | | |
|---|---|---|---|---|
| CN | 103037375 A | | 4/2013 | |
| CN | 104023351 A | | 9/2014 | |
| CN | 104427505 A | | 3/2015 | |
| CN | 105163326 A | * | 12/2015 | ............ H04W 24/08 |
| CN | 106470427 A | * | 3/2017 | ............ H04W 16/24 |
| CN | 106575246 A | * | 4/2017 | ........... G06F 9/5066 |
| CN | 107567039 A | | 1/2018 | |
| CN | 111417132 A | * | 7/2020 | ............. G06F 18/23 |
| CN | 112243249 A | | 1/2021 | |
| CN | 113015153 A | * | 6/2021 | ............ H04W 16/18 |
| CN | 116965001 A | * | 10/2023 | ............ H04L 47/12 |
| WO | 2018028376 A1 | | 2/2018 | |
| WO | WO-2019028269 A2 | * | 2/2019 | ......... G05B 23/0297 |

OTHER PUBLICATIONS

International Searching Authority. International Search Report and Written Opinion for PCT Application No. PCT/CN2021/133696 and English translation, mailed Feb. 15, 2022, pp. 1-13.

* cited by examiner

TRAFFIC SCENARIO IDENTIFICATION METHOD AND APPARATUS, DEVICE, AND STORAGE MEDIUM

CROSS-REFERENCE TO RELATED APPLICATION

This application is a national stage filing under 35 U.S.C. § 371 of international application number PCT/CN2021/133696, filed Nov. 26, 2021, which claims priority to Chinese patent application No. 202110172620.3 filed Feb. 8, 2021. The contents of these applications are incorporated herein by reference in their entirety.

TECHNICAL FIELD

The present disclosure relates to the technical field of communication, and in particular, to a traffic scenario identification method and apparatus, a device, and a storage medium.

BACKGROUND

With the rapid development of communication technologies, richer and more complicated policies are being constantly developed for base stations. However, if different policies are utilized for different base stations, a lot of manpower and financial resources are wasted; and if the same policy is utilized for all base stations, the characteristics of the locations of the base stations are neglected, failing to achieve a desired result. For example, base stations in a subway scenario often need to serve a large number of users during daytime, but no longer need to serve users late at night after the subway is closed. Therefore, a unified policy can be adopted for base stations in the subway scenario. For example, the base stations enter an energy-saving mode late at night and return to a normal mode during daytime. There are many other scenarios similar to the subway scenario, for example, children's palaces and primary schools.

In existing traffic scenario identification methods, the characteristic of the traffic model is determined based on the geographical location of the base station during base station planning. The geographical location is, for example, a school, a hospital, a subway, a high-speed rail, etc. However, in practice, different traffic models may exist in the same location. For example, in schools, base stations for classrooms have traffic during daytime and have no traffic late at night, and base stations for dormitories have no traffic during daytime and have traffic at night. In other words, different base stations in a school have different traffic scenarios. In addition, traffic scenarios recorded during planning may be incomplete or erroneous, leading to errors in subsequent analysis. Moreover, the traffic scenario of a cell also changes over time and does not remain unchanged all the time.

SUMMARY

In view of the above, embodiments of the present disclosure provide a traffic scenario identification method and apparatus, a device, and a storage medium.

An embodiment of the present disclosure discloses a traffic scenario identification method. The method may include: constructing a plurality of data features according to user data of a cell to be identified within a set period of time, the data features including cell-level features and sector-level features; selecting, from the plurality of data features, a set number of data features corresponding to a candidate traffic scenario; and inputting the set number of data features into a scenario identification binary classification model corresponding to the candidate traffic scenario to obtain a target traffic scenario of the cell to be identified.

An embodiment of the present disclosure discloses a traffic scenario identification apparatus. The apparatus may include: a data feature construction module, configured for constructing a plurality of data features according to user data of a cell to be identified within a set period of time, the data features including cell-level features and sector-level features; a data feature selection module, configured for selecting, from the plurality of data features, a set number of data features corresponding to a candidate traffic scenario; and a target traffic scenario determination module, configured for inputting the set number of data features into a scenario identification binary classification model corresponding to the candidate traffic scenario to obtain a target traffic scenario of the cell to be identified.

An embodiment of the present disclosure discloses a computing device, which may include a memory, a processor, and a computer program stored in the memory and executable by the processor, where the computer program, when executed by the processor, causes the processor to implement the traffic scenario identification method in accordance with the embodiments of the present disclosure.

An embodiment of the present disclosure discloses a computer-readable storage medium, storing a computer program which, when executed by a processor, causes the processor to implement the traffic scenario identification method in accordance with the embodiments of the present disclosure.

DETAILED DESCRIPTION

Objects, technical schemes and advantages of the present disclosure will become clear from a detailed description of embodiments of the present disclosure in conjunction with the drawings. It is to be noted that the embodiments and features therein in the present disclosure may be combined with each other if not in collision.

It should be understood that the embodiments described herein are merely used for illustrating the present disclosure, and are not intended to limit the present disclosure.

In the following description, suffixes such as "module", "component", or "unit" used to represent elements are used for facilitating the description of the present disclosure only, and do not have special meanings. Therefore, "module", "component", and "unit" may be used interchangeably.

Figure 1:
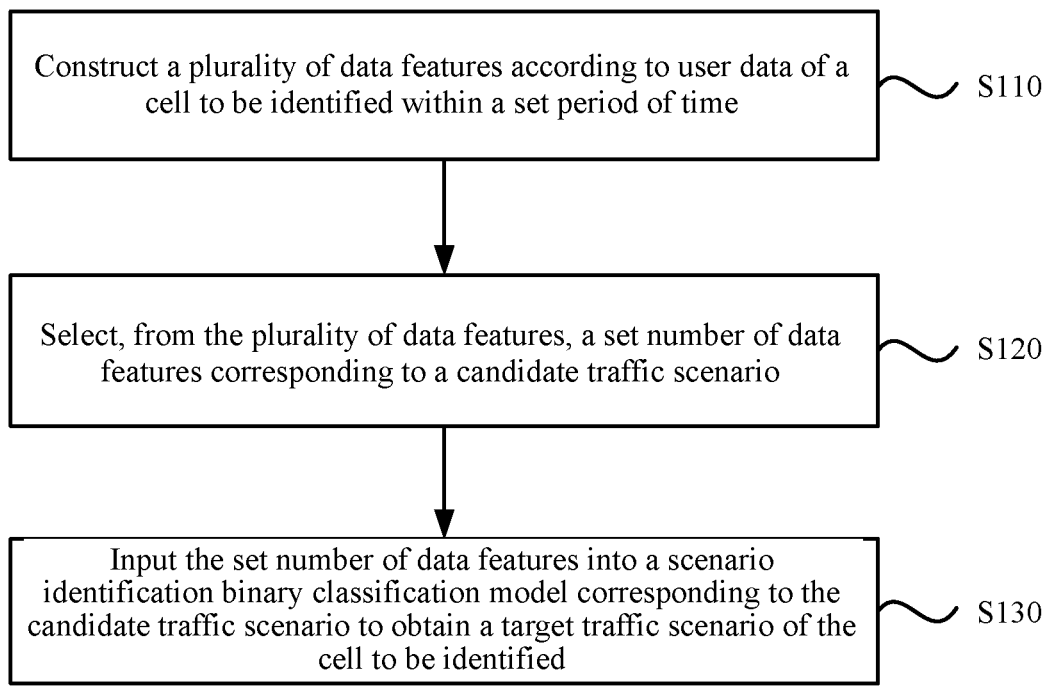
FIG. 1 is a flowchart of a traffic scenario identification method according to an embodiment of the present disclosure.

FIG. 1 is a flowchart of a traffic scenario identification method according to an embodiment of the present disclosure. In an embodiment, this method may be applied for the identification of a traffic scenario of a cell. The method may be performed by a traffic scenario identification apparatus. As shown in FIG. 1, the method includes the following steps S110 to S130.

At S110, a plurality of data features are constructed according to user data of a cell to be identified within a set period of time.

The data features include cell-level features and sector-level features. The set period of time may be 1 week, 1 month, 6 months, etc. The user data may be the number of users having established a Radio Resource Control (RRC) connection. The user data within the set period of time may be user data divided at a set granularity within the set period of time, for example, at a granularity of hours.

In an embodiment of the present disclosure, the plurality of data features may be constructed according to the user data of the cell to be identified within the set period of time in the following manner: acquiring user data, which is divided at a set granularity, of the cell to be identified and a sector where the cell to be identified is located within the set period of time, where the sector includes the cell to be identified and a co-coverage cell of the cell to be identified; constructing the cell-level features according to the user data corresponding to the cell to be identified; and constructing the sector-level features according to the user data corresponding to the sector where the cell to be identified is located.

The sector includes the cell to be identified and a co-coverage cell of the cell to be identified. The co-coverage cell meets the following conditions that: the co-coverage cell has a longitude and a latitude differing from that of the cell to be identified by a first set value (e.g., 100 meters); the co-coverage cell has an azimuth differing from that of the cell to be identified by a second set value (e.g., 30 degrees); the co-coverage cell is an outdoor cell; and the co-coverage cell has a different frequency point from the cell to be identified.

In this embodiment, the construction of the data features may be understood as: statistically analyzing the user data to obtain the plurality of data features. The cell-level features include: a basic information class, a low traffic class, a high traffic class, a correlation class, a difference class, a mutation class, and a distribution class. The sector-level features include: a sector basic information class, a sector low traffic class, and a sector high traffic class. For example, Table 1 shows the constructed cell-level features, and Table 2 shows the constructed sector-level features.

TABLE 1

| Feature type | Feature | Feature description |
| --- | --- | --- |
| Basic information | Average number of users during daytime | Number of users during daytime (including weeks, days, working days, weekends, etc.) |
| | Average number of users in busy hours | Number of users in busy hours (including weeks, days, working days, weekends, etc.) |
| | Mean | Mean of the numbers of users (including weeks, days, working days, weekends, etc.) |
| | Variance | Variance of the numbers of users (including weeks, days, working days, weekends, etc.) |
| | Maximum | Maximum number of users (including week, days, working day, weekends, etc.) |
| | Minimum | Minimum number of users (including weeks, days, working days, weekends, etc.) |
| | Number of hours above the mean | Number of hours exceeding the mean (including weeks, days, working days, weekends, etc.) |
| Low traffic | Low-user days | Days, with a large number of hours during which the number of users is small, in a week |
| | Low-user hours | Number of hours during which the number of users is small in a week |
| | Time points with low user counts | Time point at which the number of users is small |
| High traffic | High-user days | Days, with a large number of hours during which the number of users is large, in a week |
| | High-user hours | Number of hours during which the number of users is large in a week |
| | Time points with high user counts | Time point at which the number of users is large |
| Correlation | Multi-day correlation | Correlation between multiple days (including minimum, maximum, mean, etc.) |
| Difference | Week-hour difference | Difference between weekly average and an hour (including absolute and relative differences) |
| | Week-day difference | Difference between weekly average and daily average (including absolute and relative differences) |
| | Difference between day and night | Daily difference between day and night (including absolute and relative differences) |
| | Difference between maximum and minimum | Difference between maximum and minimum daily values (including absolute and relative differences) |
| Mutation | Number of times of mutation | Number of times of mutation (e.g., in each day, multiple days, working days, weekends, etc.) |
| | Mutation time points | Time point where the mutation occurs |

TABLE 1-continued

| Feature type | Feature | Feature description |
| --- | --- | --- |
| Distribution class | TA distribution | Proportion of TA in a certain interval |
| | RSRP distribution | Proportion of RSRP in a certain interval |
| | NI distribution | Proportion of NI in a certain interval |
| | PL distribution | Proportion of PL in a certain interval |
| | MCS distribution | Proportion of MCS in a certain interval |
| | CQI distribution | Proportion of CQI in a certain interval |

TA represents a Timing Advance (TA) distribution. RSRP represents a cell-specific Reference Signal Received Power (RSRP). NI represents Noise and Interference (NI). PL represents Path Loss (PL). MCS represents Modulation and Coding Scheme (MCS). CQI represents a downlink Channel Quality Indicator (CQI).

TABLE 2

| Feature type | Feature | Feature description |
| --- | --- | --- |
| Sector basic information | Cell count | Number of cells in the sector |
| | Average number of users during daytime | Number of users during daytime (including weeks, days, working days, weekends, etc.) |
| | Average number of users in busy hours | Number of users in busy hours (including weeks, days, working days, weekends, etc.) |
| | Mean | Mean of the numbers of users (including weeks, days, working days, weekends, etc.) |
| | Variance | Variance of the numbers of users (including weeks, days, working days, weekends, etc.) |
| | Maximum | Maximum number of users (including week, days, working day, weekends, etc.) |
| | Minimum | Maximum number of users (including week, days, working day, weekends, etc.) |
| | Number of hours above the mean | Number of hours exceeding the mean (including weeks, days, working days, weekends, etc.) |
| Sector low traffic | Low-user days | Days, with a large number of hours during which the number of users is small, in a week |
| | Low-user hours | Number of hours during which the number of users is small in a week |
| | Time points with low user counts | Time point at which the number of users is small |
| Sector high traffic | High-user days | Days with a large number of hours during which the number of users is large in a week |
| | High-user hours | Number of hours during which the number of users is large in a week |
| | Time points with high user counts | Time point at which the number of users is large |

At S120, a set number of data features corresponding to a candidate traffic scenario are selected from the plurality of data features.

Figure 2:
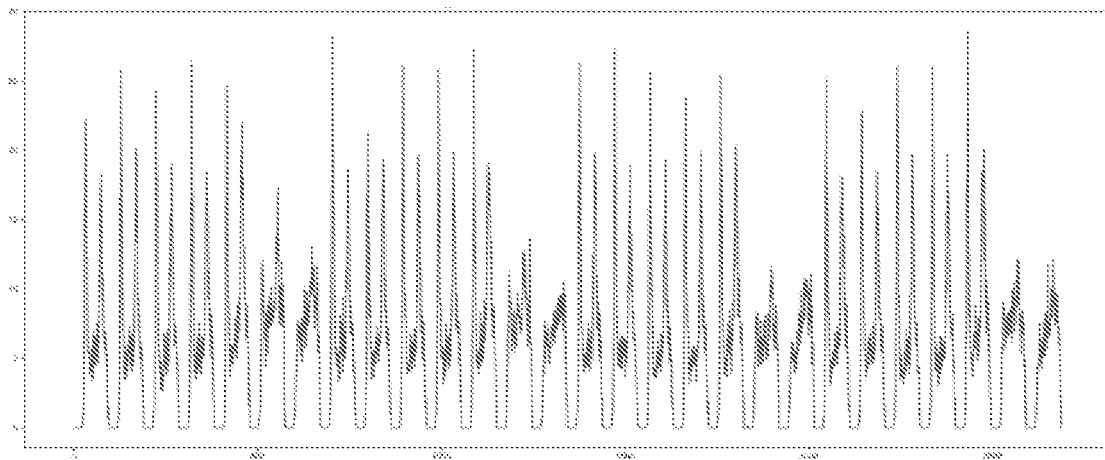
FIG. 2 is a diagram showing user data in a subway-like scenario according to an embodiment of the present disclosure.
Figure 3:
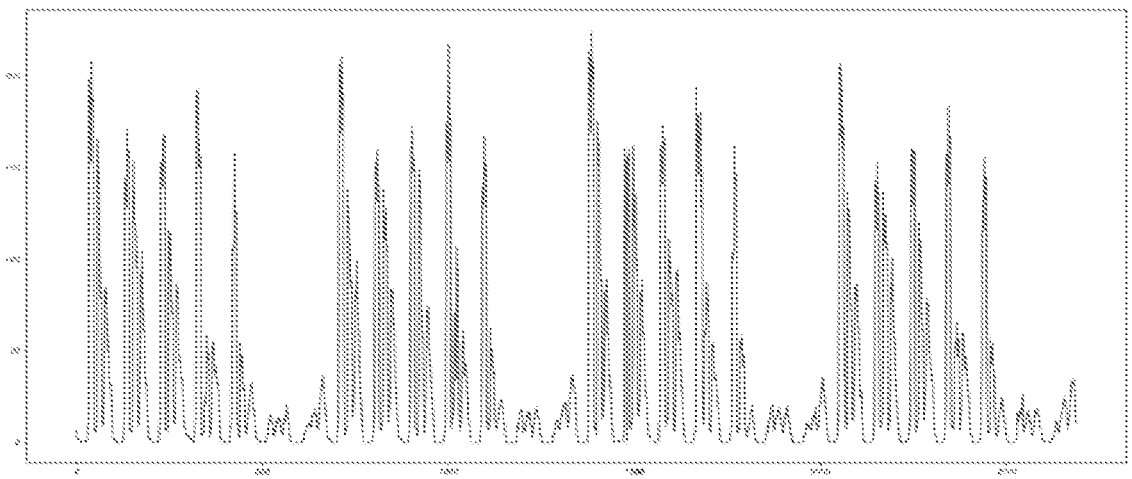
FIG. 3 is a diagram showing user data in a working-day high peak scenario according to an embodiment of the present disclosure.

There may be a plurality of candidate traffic scenarios, which may be manually set. For example, the candidate traffic scenarios include a subway-like scenario, a working-day high peak scenario, a burst scenario, etc. For example, FIG. 2 is a diagram showing user data in a subway-like scenario according to an embodiment of the present disclosure. FIG. 3 is a diagram showing user data in a working-day high peak scenario according to an embodiment of the present disclosure. FIG. 2 to FIG. 3 show user data within one month. In this example, the selected set number of data features may vary with different traffic scenarios. Assuming that the candidate traffic scenarios include the subway-like scenario, the working-day high peak scenario, and the burst scenario, a first set number of data features corresponding to the subway-like scenario, a second set number of data features corresponding to the working-day high peak scenario, and a third set number of data features corresponding to the burst scenario need to be selected, respectively.

At S130, the set number of data features are input into a scenario identification binary classification model corresponding to the candidate traffic scenario to obtain a target traffic scenario of the cell to be identified.

In this embodiment, different traffic scenarios correspond to different scenario identification binary classification models. It is assumed that the candidate traffic scenarios include the subway-like scenario, the working-day high peak scenario, and the burst scenario. In this case, the first set number of data features are input into a scenario identification binary classification model corresponding to the subway-like scenario to determine whether the cell to be identified belongs to the subway-like scenario; the second set number of data features are input into a scenario identification binary classification model corresponding to the working-day high peak scenario to determine whether the cell to be identified belongs to the working-day high peak scenario; and the third set number of data features are input into a scenario identification binary classification model corresponding to the burst scenario to determine whether the cell to be identified belongs to the burst scenario.

According to the technical scheme of this embodiment, a plurality of data features are constructed according to user data of a cell to be identified within a set period of time, the data features including cell-level features and sector-level features; a set number of data features corresponding to a candidate traffic scenario are selected from the plurality of data features; and the set number of data features are input into a scenario identification binary classification model corresponding to the candidate traffic scenario to obtain a target traffic scenario of the cell to be identified. In the traffic scenario identification method according to this embodiment of the present disclosure, the set number of features are selected from the constructed data features and input into the scenario identification binary classification model corresponding to the candidate traffic scenario to obtain the target traffic scenario of the cell to be identified. Thus, the traffic scenario of the cell can be quickly and accurately determined.

Figure 4:
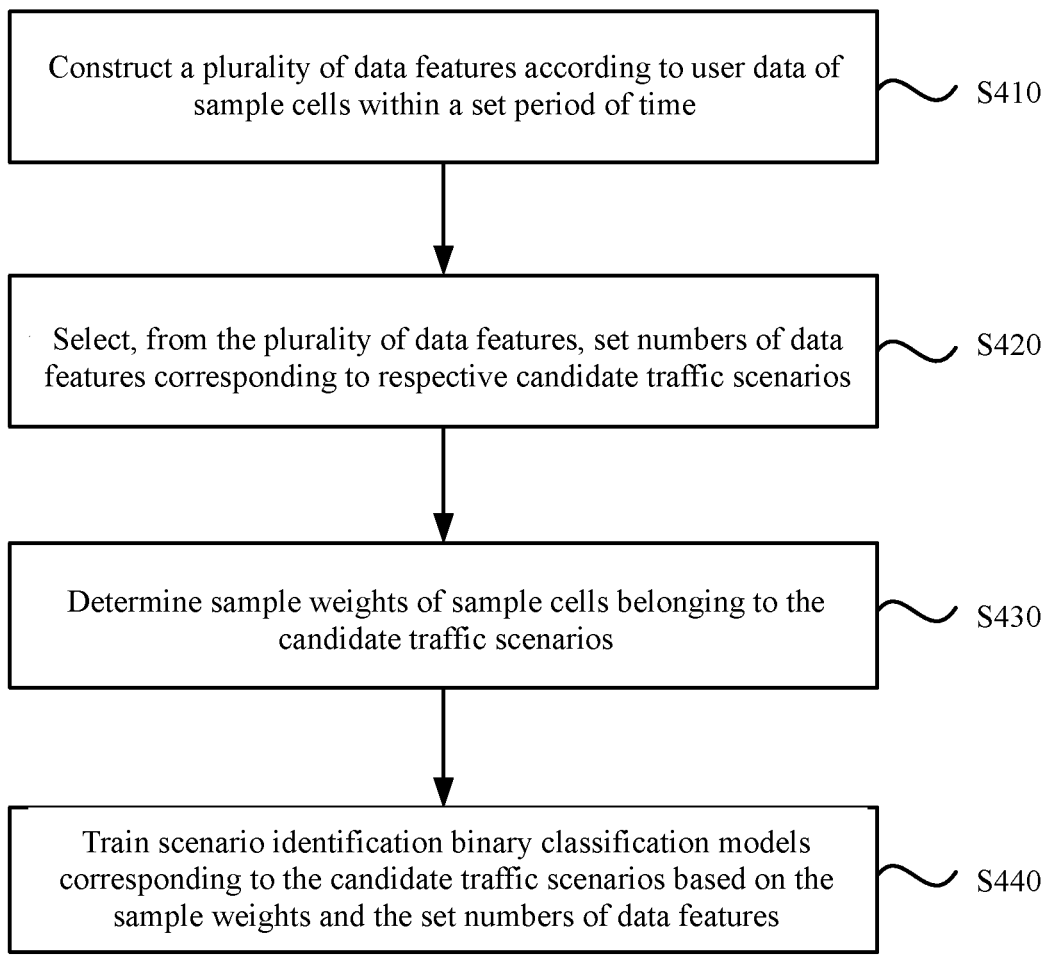
FIG. 4 is a flowchart of a method for training a scenario identification binary classification model according to an embodiment of the present disclosure.

FIG. 4 is a flowchart of a method for training a scenario identification binary classification model according to an embodiment of the present disclosure. In some embodiments, as shown in FIG. 4, the method for training a scenario identification binary classification model includes the following steps S410 to S440.

At S410, a plurality of data features are constructed according to user data of sample cells within a set period of time.

The sample cells may include cells located at specific locations (such as subways, shopping malls, office buildings, parks, schools, stadium, etc.). The set period of time may be one week, one month, six months, etc. The user data may be the number of users having established a Radio Resource Control (RRC) connection. The user data within the set period of time may be user data divided at a set granularity within the set period of time, for example, at a granularity of hours.

In an implementation, a process of constructing the plurality of data features from the user data of the sample cells within the set period of time may include: acquiring user data, which is divided at a set granularity, of the sample cells and a sector where the sample cells are located within the set period of time; constructing cell-level features according to the user data corresponding to the sample cells; and constructing sector-level features according to the user data corresponding to the sector where the sample cells are located.

In this embodiment, reference is made to Table 1 for the constructed cell-level features and to Table 2 for the constructed sector-level features, and the details will not be repeated herein.

At S420, set numbers of data features corresponding to respective candidate traffic scenarios are selected from the plurality of data features.

In an embodiment of the present disclosure, the selected set number of data features may vary with different candidate traffic scenarios. For example, the set numbers of data features corresponding to respective candidate traffic scenarios may be selected from the plurality of data features in the following manner: classifying the sample cells into a candidate traffic scenario class and a non-candidate traffic scenario class; determining classification indexes of the data features according to the candidate traffic scenario class and the non-candidate traffic scenario class; and selecting the set numbers of data features from the plurality of data features according to the classification indexes.

In an implementation, the classification indexes of the data features may be determined according to the candidate traffic scenario class and the non-candidate traffic scenario class in the following manner: determining, for each data feature, a feature center of the data feature within the candidate traffic scenario class; calculating an average intra-class distance between the data features and the feature centers within the candidate traffic scenario class; calculating an average inter-class distance between the data features and the feature centers within the non-candidate traffic scenario class; and calculating a weighted sum of the average intra-class distance and the average inter-class distance to obtain the classification index of the data feature.

The feature center of each feature within the candidate traffic scenario class is calculated according to the following formula:

$$S_j = \frac{\sum_{i=1}^{n} x_{ij}}{n},$$

where $S_j$ represents a feature center of a $j^{th}$ feature, $x_{ij}$ represents a $j^{th}$ feature of an $i^{th}$ sample cell of the candidate traffic scenario class, and n represents that the candidate traffic scenario class has n sample cells.

The average intra-class distance between the data features and the feature centers within the candidate traffic scenario class is calculated according to the following formula:

$$D_{jin} = \frac{\sum_{i=1}^{n}(|x_{ij} - S_j|)^p}{n * S_j}.$$

The average inter-class distance between the data features and the feature centers within the non-candidate traffic scenario class is calculated according to the following formula:

$$D_{jout} = \frac{\sum_{i=1}^{m}(|y_{ij} - S_j|)^p}{m * S_j},$$

where $y_{ij}$ represents a $j^{th}$ feature of an $i^{th}$ sample cell of the non-candidate traffic scenario class, m represents that the non-candidate traffic scenario class has m sample cells, and p represents a distance index, which is a positive integer and may be set to 2.

The weighted sum of the average intra-class distance and the average inter-class distance may be calculated according to the following formula: $D_j = c_1 * D_{jout} - c_2 * D_{jin}$, where $c_1$ and $c_2$ are in a range of [0, 1], $c_1$ may be 0.3, and $c_2$ may be 0.7. In an embodiment of the present disclosure, a larger classification index indicates that the data feature is more favorable for classification.

In an embodiment of the present disclosure, after the classification indexes of the data features are obtained, the data features are sorted in descending order of the classification indexes, and then a set number of data features with upper ranking are extracted as the data features of the candidate traffic scenario. The set number may be any value ranging from 10 to 20. The selected number may vary with different candidate traffic scenarios.

At S430, sample weights of the sample cells belonging to the candidate traffic scenarios are determined.

In an embodiment of the present disclosure, the number of samples is often very small in some traffic scenarios, and thus the numbers of samples in different traffic scenarios are very unbalanced. To avoid the impact of unbalanced numbers of samples on the model, the samples need to be weighted.

The sample weights of the sample cells belonging to the candidate traffic scenarios may be calculated according to the following formula:

$$w_n = v_n * \frac{1}{\ln\left(1 + \frac{P_n}{v_n}\right)},$$

where $P_n$ represents a proportion of the number of samples of a certain candidate traffic scenario; $v_n$ represents a customized category importance, which is set by a user, has a value range of [0, 1], and is 1 by default; and $w_n$ represents a weight of a certain candidate traffic scenario category.

At S440, scenario identification binary classification models corresponding to the candidate traffic scenarios are trained based on the sample weights and the set numbers of data features.

In this embodiment, one candidate traffic scenario corresponds to one scenario identification binary classification model.

In an implementation, the scenario identification binary classification models corresponding to the candidate traffic scenarios may be trained based on the sample weights and the set numbers of data features in the following manner: configuring a plurality of parameters for a set neural network to obtain a plurality of initial binary classification models; dividing the sample cells into a training set and a test set according to a set ratio; training the plurality of initial binary classification models based on the training set respectively to obtain a plurality of intermediate binary classification models; testing the plurality of intermediate binary classification models based on the test set respectively to obtain test results; and determining the scenario identification binary classification model according to the test results. In some implementations, the parameters include enumerated parameters.

The set neural network may be a neural network constructed based on random forest, Gradient Boosting Decision Tree (GBDT), xgboost, or other algorithms. Configuring enumerated parameters may be understood as adjusting parameters in the neural network by a grid method. The set ratio may be 3:1. The intermediate binary classification model with the highest precision in the test results is determined as the final scenario identification binary classification model.

In an embodiment of the present disclosure, the plurality of initial binary classification models may be trained based on the training set respectively in the following manner to obtain the plurality of intermediate binary classification models: dividing the training set into N pieces of data for each initial binary classification model; traversing the N pieces of data, utilizing one piece of data which is traversed as a verification set, and utilizing the other N−1 pieces of data which are traversed as a training subset; training the initial binary classification model based on the training subset, and verifying the trained initial binary classification model based on the verification set to obtain a verification result, where N trained initial binary classification models and N verification results are obtained after the traversal of the N pieces of data is complete; and determining an intermediate binary classification model corresponding to the initial binary classification model from the N trained initial binary classification models according to the verification result.

N may be set to 5. In an implementation, the intermediate binary classification model with the highest precision in the verification results is determined as the intermediate binary classification model corresponding to the initial binary classification model According to the technical scheme of this embodiment of the present disclosure, a plurality of data features are constructed according to user data of sample cells within a set period of time; set numbers of data features corresponding to respective candidate traffic scenarios are selected from the plurality of data features; sample weights of the sample cells belonging to the candidate traffic scenarios are determined; and scenario identification binary classification models corresponding to the candidate traffic scenarios are trained based on the sample weights and the set numbers of data features. In the traffic scenario identification method according to this embodiment of the present disclosure, the scenario identification binary classification models corresponding to the candidate traffic scenarios are trained based on the sample weights and the set numbers of data features, and the target traffic scenario of the cell to be identified is determined based on the trained scenario identification binary classification models. Thus, the traffic scenario of the cell can be quickly and accurately determined.

For example, in the following embodiments, the scenario identification binary classification model corresponding to the subway-like scenario is trained.

Table 3 shows codes of categories of the sample cells.

TABLE 3

| Category code | Category name |
| --- | --- |
| 0 | Subway-like scenario |
| 1 | Non-subway-like scenario |

The classification indexes of the data features of the subway-like scenario and the non-subway-like scenario are determined in the manner disclosed in the above embodiments. A set number of data features of which the classification indexes have upper ranking are selected and determined as the data features corresponding to the subway-like scenario.

The sample weights of the sample cells belonging to the subway-like scenario may be calculated according to the following formula:

$$w_n = v_n * \frac{1}{\ln\left(1 + \frac{P_n}{v_n}\right)},$$

where $P_n$ represents a proportion of the number of samples of a certain candidate traffic scenario; $v_n$ represents a customized category importance, which is set by a user, has a value range of [0, 1], and is 1 by default; and $w_n$ represents a weight of a certain candidate traffic scenario category. Table 4 shows values of v.

TABLE 4

| Category code | Category name | v |
|---|---|---|
| 0 | Subway-like scenario | 1 |
| 1 | Non-subway-like scenario | 0.8 |

In this embodiment, the neural network is constructed utilizing the xgboost algorithm. Adjusted parameters include a base classifier number n_estimators, a maximum base classifier depth max_depth, a minimum leaf node splitting threshold gamma, a learning rate learning_rate, and a column sample ratio colsample_bytree.

Enumerated variables of each parameter are set as follows: n_estimators=[50,100,150,200]; max_depth=[6,8,10,15]; gamma=[0,0.1,0.2]; learning_rate=[0.1,0.3,0.5]; and colsample_bytree=[0.5,0.8,1]. In this way, 4*4*3*3*3=432 initial binary classification models can be obtained.

For each initial binary classification model, the sample cells are divided into a training set and a test set at a ratio of 0.75:0.25. The training set is further divided into five parts with four parts utilized for training and one part utilized for verification. The training and verification are cyclically performed five times to obtain five models. Among the five models, the model with the highest precision is selected as a model for current training, and the model is tested utilizing the test set to obtain a classification result of the test set.

According to the classification process based on xgboost, a confusion matrix is utilized to indicate the quality of the classification result. The confusion matrix is shown in Table 5.

TABLE 5

| | | Predicted value | |
|---|---|---|---|
| | | 0 | 1 |
| True value | 0 | TP | FP |
| | 1 | FN | TN |

The test result of the model is evaluated according to the following formula:

$$\text{Precision} = \frac{TP}{TP+FP}; \text{Recall} = \frac{TP}{TP+FN}; \text{ and } F1 = \frac{2*\text{Precision}*\text{Recall}}{\text{Precision}+\text{Recall}}.$$

F1 represents a final evaluation score of the model. A higher F1 indicates a more accurate model. The model with the highest F1 is selected as the final scenario identification binary classification model.

For example, in the following embodiments, the scenario identification binary classification model corresponding to the working-day high peak scenario is trained.

Table 6 shows codes of categories of the sample cells.

TABLE 6

| Category code | Category name |
|---|---|
| 0 | Working-day high peak scenario |
| 1 | Non-working-day high peak scenario |

The classification indexes of the data features of the working-day high peak scenario and the non-working-day high peak scenario are determined in the manner disclosed in the above embodiments. A set number of data features of which the classification indexes have upper ranking are selected and determined as the data features corresponding to the working-day high peak scenario.

The sample weights of the sample cells belonging to the working-day high peak scenario may be calculated according to the following formula:

$$w_n = v_n * \frac{1}{\ln\left(1+\frac{P_n}{v_n}\right)},$$

where $P_n$ represents a proportion of the number of samples of a certain candidate traffic scenario; $v_n$ represents a customized category importance, which is set by a user, has a value range of [0, 1], and is 1 by default; and $w_n$ represents a weight of a certain candidate traffic scenario category. Table 7 shows values of v.

TABLE 7

| Category code | Category name | v |
|---|---|---|
| 0 | Working-day high peak scenario | 1 |
| 1 | Non-working-day high peak scenario | 0.8 |

In this embodiment, the neural network is constructed utilizing the GBDT algorithm. Adjusted parameters include a base classifier number n_estimators, a maximum base classifier depth max_depth, a maximum number of features max_features selected by the base classifier, and a learning rate learning_rate. Enumerated variables of each parameter are set as follows: n_estimators=[50,100,150,200]; max_depth=[6,8,10,12]; max_features=[sqrt,0.7,0.9,1]; and learning_rate=[0.1,0.2,0.4,0.8]. In this way, 4*4*4*4=256 initial binary classification models can be obtained.

For each initial binary classification model, the sample cells are divided into a training set and a test set at a ratio of 0.75:0.25. The training set is further divided into five parts with four parts utilized for training and one part utilized for verification. The training and verification are cyclically performed five times to obtain five models. Among the five models, the model with the highest precision is selected as a model for current training, and the model is tested utilizing the test set to obtain a classification result of the test set.

According to the classification process based on GBDT, a confusion matrix is utilized to indicate the quality of the classification result. The confusion matrix is shown in Table 8.

TABLE 8

| | | Predicted value | |
|---|---|---|---|
| | | 0 | 1 |
| True value | 0 | TP | FP |
| | 1 | FN | TN |

The test result of the model is evaluated according to the following formula:

$$\text{Precision} = \frac{TP}{TP+FP}; \text{Recall} = \frac{TP}{TP+FN}; \text{ and } F1 = \frac{2*\text{Precision}*\text{Recall}}{\text{Precision}+\text{Recall}}.$$

F1 represents a final evaluation score of the model. A higher F1 indicates a more accurate model. The model with the highest F1 is selected as the final scenario identification binary classification model.

Figure 5:
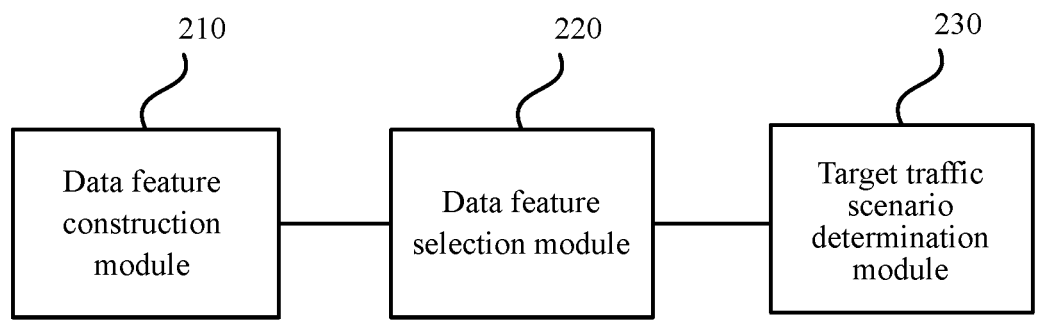
FIG. 5 is a schematic structural diagram of a traffic scenario identification apparatus according to an embodiment of the present disclosure.

FIG. 5 is a schematic structural diagram of a traffic scenario identification apparatus according to an embodiment of the present disclosure. As shown in FIG. 5, the apparatus includes a data feature construction module 210, a data feature selection module 220, and a target traffic scenario determination module 230.

The data feature construction module 210 is configured for constructing a plurality of data features according to user data of a cell to be identified within a set period of time, the data features including cell-level features and sector-level features.

The data feature selection module 220 is configured for selecting, from the plurality of data features, a set number of data features corresponding to a candidate traffic scenario.

The target traffic scenario determination module 230 is configured for inputting the set number of data features into a scenario identification binary classification model corresponding to the candidate traffic scenario to obtain a target traffic scenario of the cell to be identified.

In some embodiments, the data feature construction module 210 is configured for:
acquiring user data, which is divided at a set granularity, of sample cells and a sector where the sample cells are located within the set period of time, the sector including the sample cells and co-coverage cells of the sample cells;
constructing the cell-level features according to the user data corresponding to the sample cells;
constructing the sector-level features according to the user data corresponding to the sector where the sample cells are located.

In some embodiments, the apparatus includes: a model training module, configured for:
constructing a plurality of data features according to user data of sample cells within the set period of time;
selecting, from the plurality of data features, set numbers of data features corresponding to respective candidate traffic scenarios;
determining sample weights of the sample cells belonging to the candidate traffic scenarios;
training scenario identification binary classification models corresponding to the candidate traffic scenarios based on the sample weights and the set numbers of data features.

In some embodiments, the model training module is configured for:
classifying the sample cells into a candidate traffic scenario class and a non-candidate traffic scenario class;
determining classification indexes of the data features according to the candidate traffic scenario class and the non-candidate traffic scenario class;
selecting the set numbers of data features from the plurality of data features according to the classification indexes.

In some embodiments, the model training module is configured for:
determining, for each data feature, a feature center of the data feature within the candidate traffic scenario class;
calculating an average intra-class distance between the data features and the feature centers within the candidate traffic scenario class;
calculating an average inter-class distance between the data features and the feature centers within the non-candidate traffic scenario class;
calculating a weighted sum of the average intra-class distance and the average inter-class distance to obtain the classification index of the data feature.

In some embodiments, the model training module is configured for:
configuring a plurality of parameters for a set neural network to obtain a plurality of initial binary classification models;
dividing the sample cells into a training set and a test set according to a set ratio;
training the plurality of initial binary classification models based on the training set respectively to obtain a plurality of intermediate binary classification models;
testing the plurality of intermediate binary classification models based on the test set respectively to obtain test results;
determining the scenario identification binary classification model according to the test results.

In some implementations, the parameters include enumerated parameters.

In some embodiments, the model training module is configured for:
dividing the training set into N pieces of data for each initial binary classification model;
traversing the N pieces of data, utilizing one piece of data which is traversed as a verification set, and utilizing the other N−1 pieces of data which are traversed as a training subset;
training the initial binary classification model based on the training subset, and verifying the trained initial binary classification model based on the verification set to obtain a verification result, where N trained initial binary classification models and N verification results are obtained after the traversal of the N pieces of data is complete;
determining an intermediate binary classification model corresponding to the initial binary classification model from the N trained initial binary classification models according to the verification result.

Figure 6:
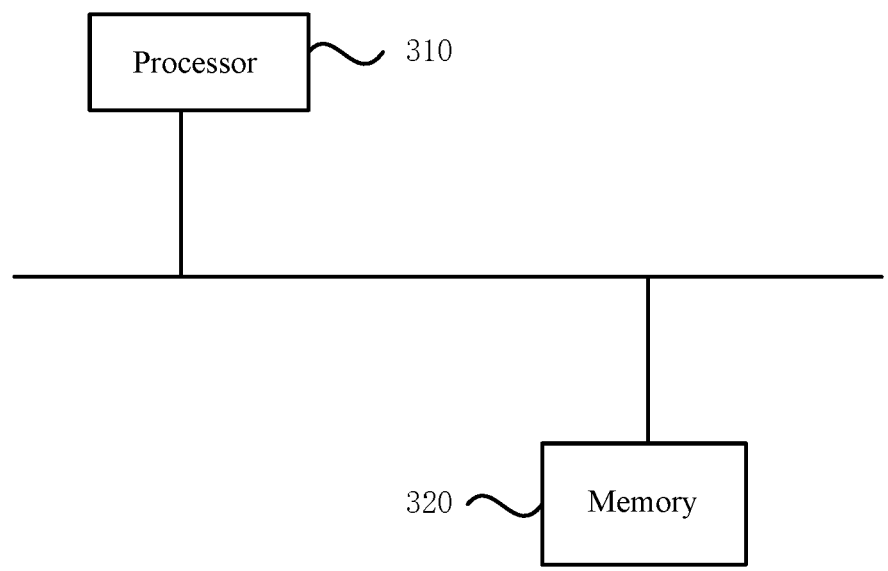
FIG. 6 is a schematic structural diagram of a device according to an embodiment of the present disclosure.

In an embodiment, FIG. 6 is a schematic structural diagram of a device according to an embodiment of the present disclosure. As shown in FIG. 6, the device provided by the present disclosure includes a processor 310 and a memory 320. The device may include one or more processors 310, and one processor 310 is taken as an example in FIG. 6. The device may include one or more memories 320, and one memory 320 is taken as an example in FIG. 6. The processor 310 and the memory 320 in the device may be connected by a bus or in other ways. Connection by a bus is taken as an example in FIG. 6. In an embodiment, the device is a computing device.

The memory 320, as a computer-readable storage medium, may be configured for storing a software program, a computer-executable program, and modules, for example, program instructions/modules corresponding to the device according to any embodiment of the present disclosure (for example, the data feature construction module 210, the data feature selection module 220, and the target traffic scenario determination module 230 in the traffic scenario identification apparatus). The memory 320 may include a program storage area and a data storage area. The program storage area may store an operating system, and an application required by at least one function. The data storage area may store data created according to the use of the device and the like. In addition, the memory 320 may include a high speed random access memory, and may also include a nonvolatile memory, e.g., at least one magnetic disk storage device, flash memory device, or other nonvolatile solid-state storage device. In some examples, the memory 320 may include memories located remotely from the processor 310, and the remote memories may be connected to the device via a network. Examples of the network include, but are not limited to, the Internet, an intranet, a local area network, a mobile communication network, and combinations thereof.

The device provided above may be configured for performing the traffic scenario identification method provided in any of the above embodiments, and has corresponding functions and effects.

Correspondingly, the program stored in the memory 320 may be program instructions/modules corresponding to the traffic scenario identification method provided in the embodiments of the present disclosure which, when executed by the processor 310, cause the processor 310 to implement one or more functional applications and data processing of the computing device, i.e., implement the traffic scenario identification method according to the above embodiments. It can be understood that when the device is a receiving end, the device can execute the traffic scenario identification method provided in any embodiment of the present disclosure, and has corresponding functions and effects.

According to an embodiment of the present disclosure, a storage medium containing computer-executable instructions is provided. The computer-executable instructions, when executed by a processor of a computer, cause the processor to implement a traffic scenario identification method. The method includes: constructing a plurality of data features according to user data of a cell to be identified within a set period of time, the data features including cell-level features and sector-level features; selecting, from the plurality of data features, a set number of data features corresponding to a candidate traffic scenario; and inputting the set number of data features into a scenario identification binary classification model corresponding to the candidate traffic scenario to obtain a target traffic scenario of the cell to be identified.

Embodiments of the present application disclose a traffic scenario identification method and apparatus, a device, and a storage medium. The method includes: constructing a plurality of data features according to user data of a cell to be identified within a set period of time, the data features including cell-level features and sector-level features; selecting, from the plurality of data features, a set number of data features corresponding to a candidate traffic scenario; and inputting the set number of data features into a scenario identification binary classification model corresponding to the candidate traffic scenario to obtain a target traffic scenario of the cell to be identified. In the traffic scenario identification method according to this embodiment of this application, the set number of features are selected from the constructed data features and input into the scenario identification binary classification model corresponding to the candidate traffic scenario to obtain the target traffic scenario of the cell to be identified. Thus, the traffic scenario of the cell can be quickly and accurately determined.

As will be understood by those having ordinary skills in the art, the term "user" may encompass any suitable type of wireless user equipment, such as a mobile telephone, portable data processing device, portable web browser or vehicle-mounted mobile station.

In general, the various embodiments of the present disclosure may be implemented in hardware or special purpose circuits, software, logic, or any combination thereof. For example, some aspects may be implemented in hardware, while other aspects may be implemented in firmware or software that can be executed by a controller, microprocessor or other computing device, but the present disclosure is not limited thereto.

The embodiments of the present disclosure may be implemented by the execution of computer program instructions by a data processor of a mobile device, for example, in a processor entity, or by hardware, or by a combination of software and hardware. The computer program instructions may be assembly instructions, Instruction Set Architecture (ISA) instructions, machine instructions, machine dependent instructions, microcode, firmware instructions, state setting data, or source code or object code written in any combination of one or more programming languages.

The block diagram of any logic flow in the accompanying drawings of the present disclosure may represent program steps, or may represent interconnected logic circuits, modules and functions, or may represent a combination of program steps and logic circuits, modules and functions. The computer program may be stored in a memory. The memory may be of any type suitable for the local technical environment and may be implemented utilizing any suitable data storage technology, such as, but not limited to, Read-Only Memory (ROM), Random Access Memory (RAM), and optical storage devices and systems (Digital Versatile Disc (DVD) or Compact Disk (CD)), etc. The computer-readable medium may include a non-transitory storage medium. The data processor may be of any type suitable for the local technical environment, such as, but not limited to, a general purpose computer, a special purpose computer, a microprocessor, a Digital Signal Processor (DSP), an Application Specific Integrated Circuit (ASIC), a programmable logic device (Field-Programmable Gate Array (FPGA)), and a processor based on a multi-core processor architecture.

The above description is only example embodiments of the present disclosure, and is not intended to limit the scope of the present disclosure.

The embodiments of the present disclosure may be implemented by the execution of computer program instructions by a data processor of a mobile device, for example, in a processor entity, or by hardware, or by a combination of software and hardware. The computer program instructions may be assembly instructions, Instruction Set Architecture (ISA) instructions, machine instructions, machine dependent instructions, microcode, firmware instructions, state setting data, or source code or object code written in any combination of one or more programming languages.

The foregoing has provided a detailed description of the present disclosure by way of example and non-limiting embodiments. However, various modifications and adjustments made to the above embodiments without departing from the scope of the present disclosure are obvious to those having ordinary skills in the art in light of the accompanying drawings and the claims. The scope of the present disclosure is defined by the appended claims.

What is claimed is:
1. A traffic scenario identification method, comprising:
   constructing a plurality of data features according to user data of a cell to be identified within a set period of time, the data features comprising cell-level features and sector-level features;

selecting, from the plurality of data features, a set number of data features corresponding to a candidate traffic scenario; and inputting the set number of data features into a scenario identification binary classification model corresponding to the candidate traffic scenario to obtain a target traffic scenario of the cell to be identified, wherein a training mode of the scenario identification binary classification model comprises:

constructing a plurality of data features according to user data of sample cells within the set period of time;

selecting, from the plurality of data features, set numbers of data features corresponding to respective candidate traffic scenarios;

determining sample weights of the sample cells which belong to the candidate traffic scenarios; and training scenario identification binary classification models corresponding to the candidate traffic scenarios based on the sample weights and the set numbers of data features.

2. The method of claim 1, wherein constructing a plurality of data features according to user data of a cell to be identified within a set period of time comprises:

acquiring user data, which is divided at a set granularity, of the cell to be identified and a sector where the cell to be identified is located within the set period of time, the sector comprising the cell to be identified and a co-coverage cell of the cell to be identified;

constructing the cell-level features according to the user data corresponding to the cell to be identified; and constructing the sector-level features according to the user data corresponding to the sector where the cell to be identified is located.

3. The method of claim 1, wherein selecting, from the plurality of data features, set numbers of data features corresponding to respective candidate traffic scenarios comprises:

classifying the sample cells into a candidate traffic scenario class and a non-candidate traffic scenario class;

determining classification indexes of the data features according to the candidate traffic scenario class and the non-candidate traffic scenario class; and selecting the set numbers of data features from the plurality of data features according to the classification indexes.

4. The method of claim 3, wherein determining classification indexes of the data features according to the candidate traffic scenario class and the non-candidate traffic scenario class comprises:

determining, for each data feature, a feature center of the data feature within the candidate traffic scenario class;

calculating an average intra-class distance between the data features and the feature centers within the candidate traffic scenario class;

calculating an average inter-class distance between the data features and the feature centers within the non-candidate traffic scenario class; and calculating a weighted sum of the average intra-class distance and the average inter-class distance to obtain the classification index of the data feature.

5. The method of claim 1, wherein training scenario identification binary classification models corresponding to the candidate traffic scenarios based on the sample weights and the set numbers of data features comprises:

configuring a plurality of parameters for a set neural network to obtain a plurality of initial binary classification models;

dividing the sample cells into a training set and a test set according to a set ratio;

training the plurality of initial binary classification models based on the training set respectively to obtain a plurality of intermediate binary classification models;

testing the plurality of intermediate binary classification models based on the test set respectively to obtain test results; and determining the scenario identification binary classification model according to the test results.

6. The method of claim 5, wherein training the plurality of initial binary classification models based on the training set respectively to obtain a plurality of intermediate binary classification models comprises:

dividing the training set into N pieces of data for each initial binary classification model;

traversing the N pieces of data, utilizing one piece of data which is traversed as a verification set, and utilizing the other N−1 pieces of data which are traversed as a training subset;

training the initial binary classification model based on the training subset, and verifying the trained initial binary classification model based on the verification set to obtain a verification result, wherein N trained initial binary classification models and N verification results are obtained after the traversal of the N pieces of data is complete; and determining an intermediate binary classification model corresponding to the initial binary classification model from the N trained initial binary classification models according to the verification result.

7. A computing device, comprising:

a memory, a processor, and a computer program stored in the memory and executable by the processor, wherein the computer program, when executed by the processor, causes the processor to perform a traffic scenario identification method comprising:

constructing a plurality of data features according to user data of a cell to be identified within a set period of time, the data features comprising cell-level features and sector-level features;

selecting, from the plurality of data features, a set number of data features corresponding to a candidate traffic scenario; and inputting the set number of data features into a scenario identification binary classification model corresponding to the candidate traffic scenario to obtain a target traffic scenario of the cell to be identified, wherein a training mode of the scenario identification binary classification model comprises:

constructing a plurality of data features according to user data of sample cells within the set period of time;

selecting, from the plurality of data features, set numbers of data features corresponding to respective candidate traffic scenarios;

determining sample weights of the sample cells which belong to the candidate traffic scenarios; and training scenario identification binary classification models corresponding to the candidate traffic scenarios based on the sample weights and the set numbers of data features.

8. A non-transitory computer-readable storage medium, storing a computer program which, when executed by a processor, causes the processor to perform the traffic scenario identification method of claim 1.

9. A non-transitory computer-readable storage medium, storing a computer program which, when executed by a processor, causes the processor to perform the traffic scenario identification method of claim 2.

10. A non-transitory computer-readable storage medium, storing a computer program which, when executed by a processor, causes the processor to perform the traffic scenario identification method of claim 3.

11. A non-transitory computer-readable storage medium, storing a computer program which, when executed by a processor, causes the processor to perform the traffic scenario identification method of claim 4.

12. A non-transitory computer-readable storage medium, storing a computer program which, when executed by a processor, causes the processor to perform the traffic scenario identification method of claim 5.

13. A non-transitory computer-readable storage medium, storing a computer program which, when executed by a processor, causes the processor to perform the traffic scenario identification method of claim 6.

* * * * *